(12) United States Patent
Fowler et al.

(10) Patent No.: US 8,208,386 B2
(45) Date of Patent: Jun. 26, 2012

(54) DISCOVERY OF NETWORK DEVICES

(75) Inventors: Jeffery L. Fowler, Roseville, CA (US); Mark A. Tassinari, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1098 days.

(21) Appl. No.: 11/714,401

(22) Filed: Mar. 5, 2007

(65) Prior Publication Data
US 2008/0219184 A1  Sep. 11, 2008

(51) Int. Cl.
G01R 31/08 (2006.01)
H01R 3/00 (2006.01)
G06F 11/00 (2006.01)

(52) U.S. Cl. .......... 370/248; 370/216; 439/490; 714/25

(58) Field of Classification Search .......... 370/207, 370/254, 274, 279, 293, 315, 335, 389, 395.63, 370/401, 464–481, 492, 501, 216–228, 241–253, 370/351, 357, 400; 439/315, 488–491, 910; 709/201–203, 217, 219, 223, 224; 714/2, 714/4, 25, 32, 44–46, 716, 724
See application file for complete search history.

(56) References Cited

U.S. PATENT DOCUMENTS

| 5,359,597 | A * | 10/1994 | McLamb et al. | 370/434 |
|---|---|---|---|---|
| 6,234,830 | B1 * | 5/2001 | Ensz et al. | 439/491 |
| 6,628,203 | B1 * | 9/2003 | Oost | 340/635 |
| 6,636,499 | B1 * | 10/2003 | Dowling | 370/338 |
| 6,665,733 | B1 * | 12/2003 | Witkowski et al. | 709/249 |
| 6,681,248 | B1 * | 1/2004 | Sears et al. | 709/223 |
| 6,826,631 | B2 * | 11/2004 | Webb | 710/6 |
| 6,862,695 | B2 * | 3/2005 | Lin | 714/36 |
| 6,952,421 | B1 * | 10/2005 | Slater | 370/401 |
| 7,006,611 | B2 * | 2/2006 | Bonn et al. | 379/93.31 |
| 7,130,385 | B1 | 10/2006 | Moon | |
| 7,337,227 | B1 * | 2/2008 | Hsieh et al. | 709/227 |
| 2002/0090858 | A1 * | 7/2002 | Caveney | 439/490 |
| 2002/0181402 | A1 * | 12/2002 | Lemoff et al. | 370/238 |
| 2003/0112764 | A1 * | 6/2003 | Gaspard et al. | 370/252 |
| 2004/0073597 | A1 | 4/2004 | Cavney et al. | |
| 2004/0219824 | A1 * | 11/2004 | Conn | 439/490 |
| 2005/0141431 | A1 * | 6/2005 | Caveney et al. | 370/241 |
| 2005/0195949 | A1 | 9/2005 | Frattura | |
| 2006/0002311 | A1 * | 1/2006 | Iwanaga et al. | 370/254 |
| 2006/0034181 | A1 * | 2/2006 | Noguchi et al. | 370/242 |
| 2006/0047800 | A1 * | 3/2006 | Caveney et al. | 709/223 |
| 2006/0218301 | A1 | 9/2006 | O'Toole et al. | |
| 2006/0221866 | A1 * | 10/2006 | Shepherd | 370/255 |

(Continued)

OTHER PUBLICATIONS

HP Procurve Switch 6108 (Installation and Getting Started Guide), 2002, Hewlett Packard, pp. 1-86.*

(Continued)

*Primary Examiner* — Chi Pham
*Assistant Examiner* — Prince A Mensah

(57) ABSTRACT

Network devices, systems, and methods are described for visually identifying physically linked network devices. One network device includes a memory in connected to a processor. A network chip on the device is connected to the processor and the memory. The network chip includes logic and a number of ports. A first location indicator is associated with the network device. A physical link is established between one of the number of ports on the network device and a port on a different network device. Computer executable instructions are stored in the memory and executable by the processor to send a locate signal to visually identify the different network device.

20 Claims, 3 Drawing Sheets

U.S. PATENT DOCUMENTS

| | | | |
|---|---|---|---|
| 2006/0262727 A1* | 11/2006 | Caveney | 370/242 |
| 2006/0285499 A1* | 12/2006 | Tzeng | 370/249 |
| 2007/0064624 A1* | 3/2007 | Finn et al. | 370/254 |
| 2007/0076632 A1* | 4/2007 | Ghamami | 370/254 |
| 2007/0091818 A1* | 4/2007 | Kroupa et al. | 370/252 |
| 2007/0121649 A1* | 5/2007 | Cicchetti et al. | 370/401 |
| 2007/0140138 A1* | 6/2007 | Goffin | 370/252 |
| 2007/0237158 A1* | 10/2007 | Leef et al. | 370/395.53 |
| 2008/0043626 A1* | 2/2008 | Pham et al. | 370/241 |
| 2009/0245128 A1* | 10/2009 | Matityahu et al. | 370/252 |

OTHER PUBLICATIONS

HP Procurve Switch 6108: Installation and Getting Started Guide, Oct. 2002, pp. 1-86.*

* cited by examiner

DISCOVERY OF NETWORK DEVICES

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or a wide area network (WAN).

The use of LANs to serve a wide range of communication needs has continued to increase, with networks growing larger and devices more densely grouped. Issues with documenting and managing LANs have likewise increased the need for timely response when connectivity problems arise. This is even more important with the advent of voice over internet protocol (VoIP) replacing the function of the traditional phone network, but now operating over the same LAN as data services. Local area networks are subsuming more and more of the responsibility for carrying the total electronic communication needs of a business and/or a home.

DETAILED DESCRIPTION

Embodiments of the invention may include network devices, systems, and methods, including executable instructions for discovery of network devices. One embodiment includes a network device having a processor connected to a memory and a network chip connected to the processor and the memory and including logic and a number of ports. Computer executable instructions are storable in the memory and executable by the processor to activate a first location indicator associated with the network device and a second location indicator associated with a second, or different, network device. Embodiments may send a locate signal to visually identify a particular network device.

As used herein, a "network" refers to a communication system that links two or more computers and peripheral devices and allows users to access resources on other computers and exchange messages with other users. A network may allow users to share resources on their own systems with other network users and to access information on centrally located systems and/or systems that are located at remote offices. A network may provide connections to the Internet and/or to the networks of other organizations. The network typically includes a cable that attaches to network interface cards ("NICs") in each of the devices within the network. Users may interact with network-enabled software applications to make a network request, such as to get a file or print on a network printer. The application may also communicate with the network software, which may then interact with the network hardware to transmit information to other devices attached to the network.

A "local area network" (LAN) is a network that is located in a particular physical area, such as a building, in which computers and other network devices are linked, usually via a wiring-based cabling scheme. A LAN typically includes a shared medium to which workstations attach and through which they communicate. Local area networks often use broadcasting methods for data communication, whereby a device on the LAN can transmit a message that other devices on the LAN then "listen" to. However, the device or devices to which the message is addressed actually receives the message that is transmitted. Data is typically packaged into frames for transmission on the LAN. In some situations, the LAN media is an Ethernet, which can have, for example, a maximum bandwidth of ten (10) megabits per second (Mbps). Embodiments, however, are not limited to Ethernet network implementations.

Figure 1:
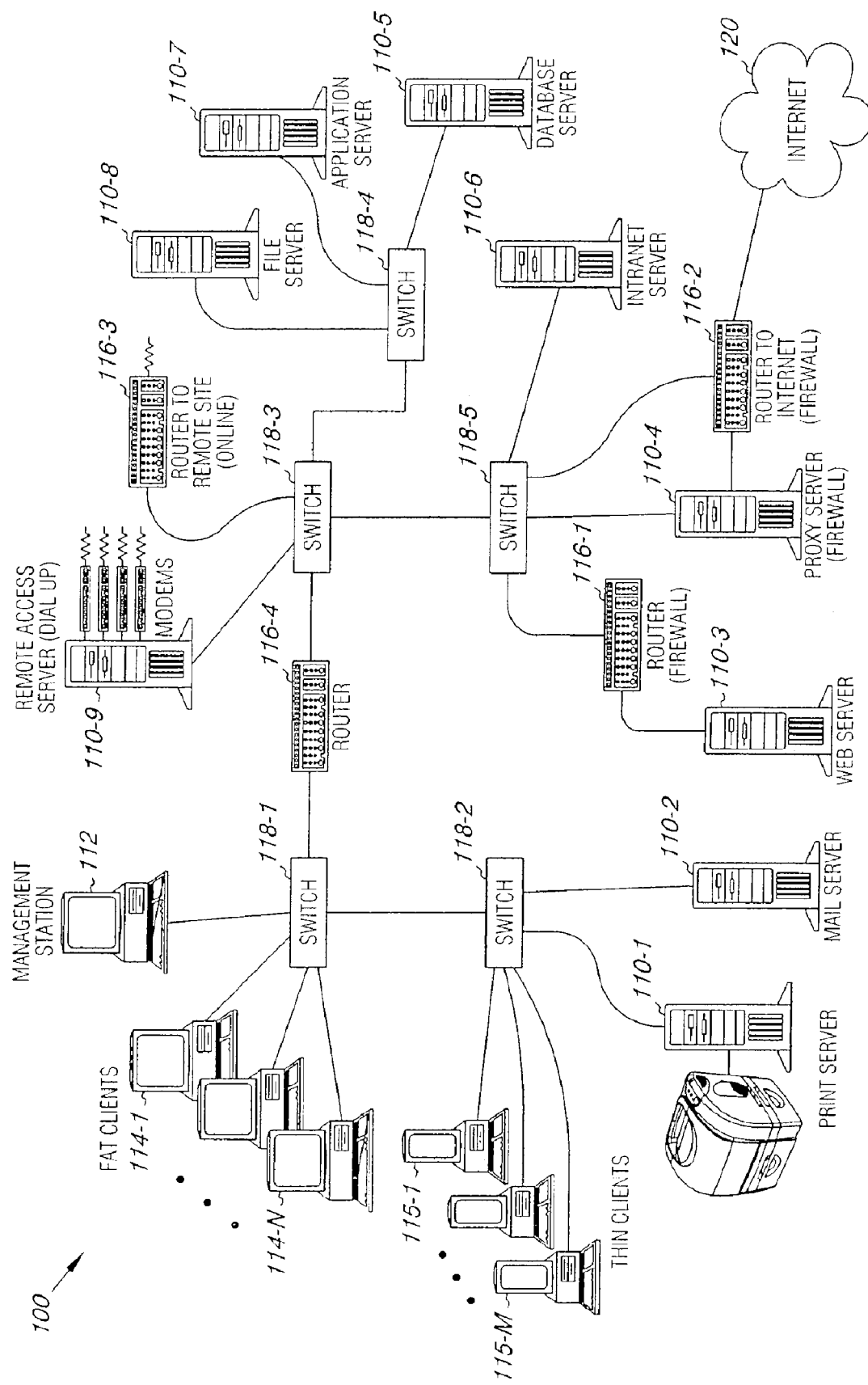
FIG. 1 is an example of a computing device network in which embodiments of the invention can be implemented.

FIG. 1 illustrates an example of a computing device network 100 in which some embodiments of the invention can be implemented. As shown in FIG. 1, a number of devices, e.g., PCs, servers, peripherals, etc., can be networked together in a LAN and/or wide area network (WAN) via routers, hubs, switches, and the like. As used herein, a "network device" refers to a switch, router, hub, bridge, etc., i.e., a device having processor and memory resources, as the same will be understood by one of ordinary skill in the art. Although a switch will often be used in this disclosure as an exemplary network device, those skilled in the art will realize that embodiments of the invention may be implemented with other network devices. As the reader will appreciate, the term "network device" can also be used to refer to servers, PCs, etc., as illustrated further herein.

FIG. 1 illustrates clients and servers in a LAN. The example network of FIG. 1 illustrates a print server 110-1 to handle print jobs for the network 100, a mail server 110-2, a web server 110-3, a proxy server (firewall) 110-4, a database server 110-5, an intranet server 110-6, an application server 110-7, a file server 110-8, and a remote access server (dial up) 110-9. The examples described here do not provide an exhaustive list of servers that may be used in a network.

The network embodiment of FIG. 1 further illustrates a network management station 112, e.g., a PC or workstation, a number of "fat" clients 114-1, . . . , 114-N which can also include PCs and workstations and/or laptops, and a number of "thin" clients 115-1, . . . , 115-M. As used herein, a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is equipped with resources, i.e., processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1 illustrates the example network devices connected to one another and/or to other networks using routers, 116-1, 116-2, 116-3, 116-4, hubs, and/or switches 118-1, 118-2, 118-3, 118-4, 118-5. As noted above, such network devices can include a processor in communication with a memory and will include network chips having hardware logic, e.g., in the form of application specific integrated circuits (ASICs), associated with a number of network ports. The term "network" as user herein is not limited to the number and/or type of network devices illustrated in FIG. 1. And, embodiments of the various devices in the network are not limited to a number, type, or size of processor or memory resources and/or logic.

Program instructions (e.g., computer executable instructions), as described in more detail herein, can reside on the various network devices. For example, program instructions in the form of firmware, and/or software (both in the form of executable instructions) can be resident on the network 100 in the memory of a network management station 112 and/or one or more routers, 116-1, 116-2, 116-3, 116-4, hubs, and/or switches 118-1, 118-2, 118-3, 118-4, 118-5, and can be executable by the processor(s) and/or logic (e.g., hardware in the form of transistor gates) thereon. Also, program instructions can be resident in a number of locations on various network devices in the network 100 as can be employed in a distributed computing network.

A "distributed computing network" refers to the use of multiple computing devices, e.g., having processor and memory resources, in a network to execute various roles in executing instructions, e.g., application processing, etc., as described herein. "Software" as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (e.g., Flash memory), etc.

As one of ordinary skill in the art will appreciate, each network device in the network 100 can be physically associated with a port of a switch to which it is connected. Data packets pass through the network. Users physically connect to the network through these ports. Data frames, or packets, can be transferred between network devices by means of a switch's logic link control (LLC)/media access control (MAC) circuitry, or "engines", associated with ports on a network device, e.g., switch. A network switch forwards data frames received from a transmitting network device to a destination network device based on the header information in received data packets. The switch can also forward packets from a given network to other networks through ports on one or more other switches.

Figure 2:
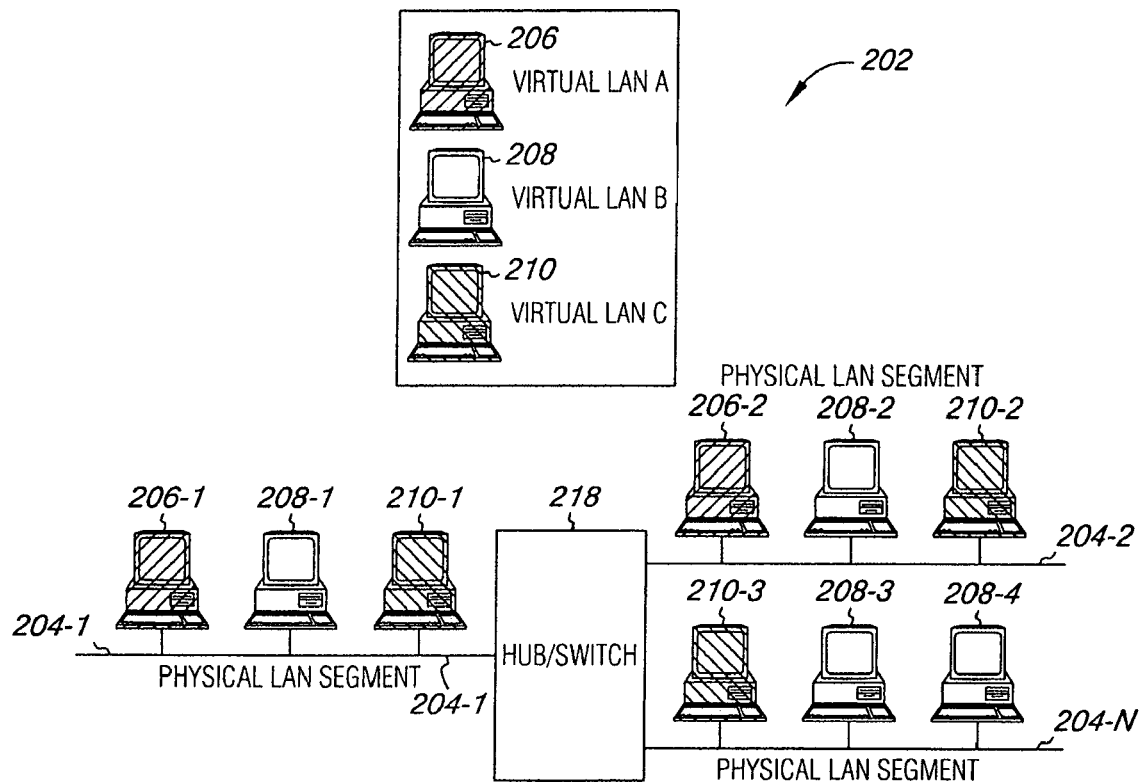
FIG. 2 illustrates a local area network (LAN) switch in which embodiments of the invention can be implemented.

FIG. 2 illustrates a local area network (LAN) switch in which an embodiment of the invention is implemented. FIG. 2 illustrates a portion of a network 202, such as a portion of network 100 in FIG. 1, including virtual local area network (VLAN) logical subgroups e.g., virtual LAN A 206, virtual LAN B 208, virtual LAN C 210, relative to various physical LAN segments, e.g., 204-1, 204-2, . . . , 204-N, to which multiple network devices, e.g., 206-1, 206-2, 208-1, 208-2, 208-3, 2084, 210-1, 210-2, 210-3, can be attached.

In the VLAN mode of operation, the switches, e.g., 218, transport frames or packets back and forth between network devices, e.g., 206-1, 206-2, 208-1, 208-2, 208-3, 208-4, 210-1, 210-2, 210-3, designated as members of a particular VLAN, e.g., virtual LAN A 206, virtual LAN B 208, virtual LAN C 210.

In the present disclosure, the term "switching" refers to a technology in which a network device (e.g., a switch 218) connects two or more LAN or VLAN segments. A switch 218 can transmit frames of data from one segment to their destinations on the same or other segments. When a switch 218 begins to operate, it examines the media access control (MAC) address of the frames that flow through it to build a table of known sources. If the switch 218 determines that the destination of a frame is on the same segment as the source of the frame, it drops, or filters the frame because there is no need to transmit it. If the switch 218 determines that the destination is on another segment, it can transmit the frame onto the destination segment. Switch configured VLANs can divide a large, unwieldy local network into smaller segments, insulating each segment from local traffic on other segments, thus increasing aggregate bandwidth while still retaining full connectivity. Switches 218 can include many ports, allowing several independent data paths through the device. The more ports a switch 218 includes the greater the data throughput capabilities of the switch 218.

However, as mentioned in the background, issues with documenting and managing LANs and VLANs have likewise increased the need for timely response when connectivity problems arise. LAN and VLAN connections within an enterprise are becoming more difficult to track down and identify, even with volumes of documentation, in order to quickly isolate physical and/or virtual connections for purposes of troubleshooting network connectivity issues.

Figure 3:
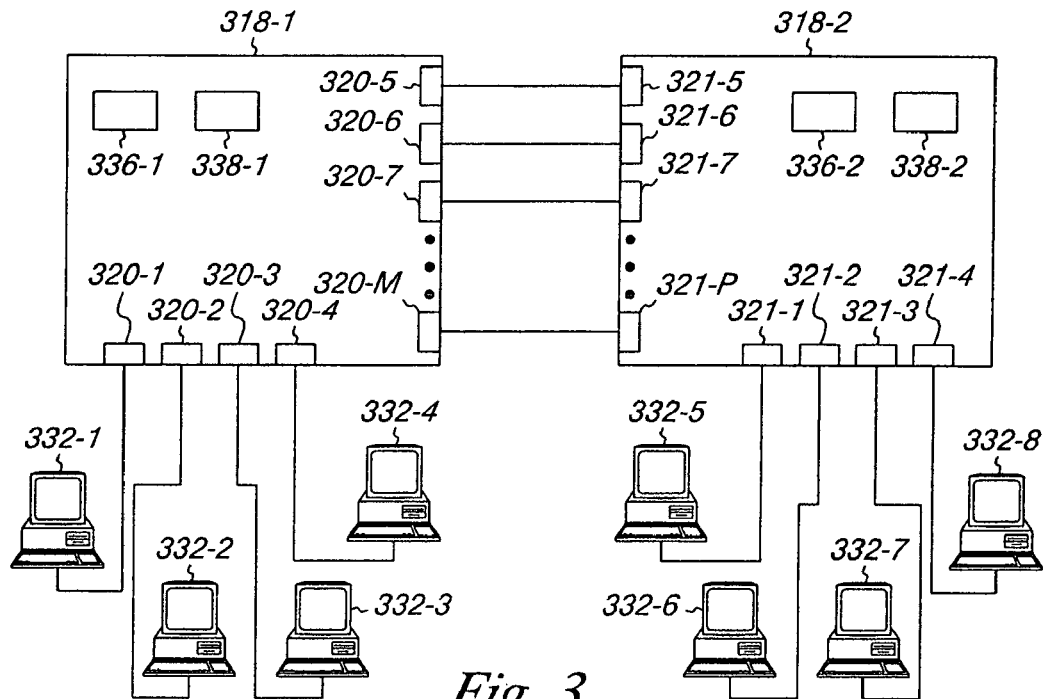
FIG. 3 illustrates two LAN switches connected to one another and in which embodiments of the invention can be implemented.

FIG. 3 illustrates two LAN switches 318-1, 318-2 in a portion of a network, e.g., a portion of network 100 shown in FIG. 1, connected to one another and in which embodiments can be implemented. As noted above, as physical LANs and VLAN configuration increase due to additional users and/or additional network devices, additional switches, e.g., 318-1 and 318-2, may be added to the physical LAN and connected to other switches to provide more ports and new network segments.

As shown in FIG. 3, two LAN switches 318-1 and 318-2 are connected. As shown, each of the LAN switches 318-1 and 318-2 contains a number of ports, 320-1, 320-2, . . . , 320-M and 321-1, 321-2, . . . , 321-P, respectively. In the embodiment of FIG. 3, on each of the LAN switches 318-1 and 318-2, the number of ports, 320-1, 320-2, . . . , 320-M and 321-1, 321-2, . . . , 321-P, respectively, can be connected to computer workstations 332-1, . . . , 332-4 and 332-5 through 332-8, respectively. The other ports on each LAN switch, i.e., ports 320-1, . . . , 320-M on LAN switch 318-1, and ports 321-1, . . . , 321-P on LAN switch 318-2, can be used for inter-switch communication.

Figure 4:
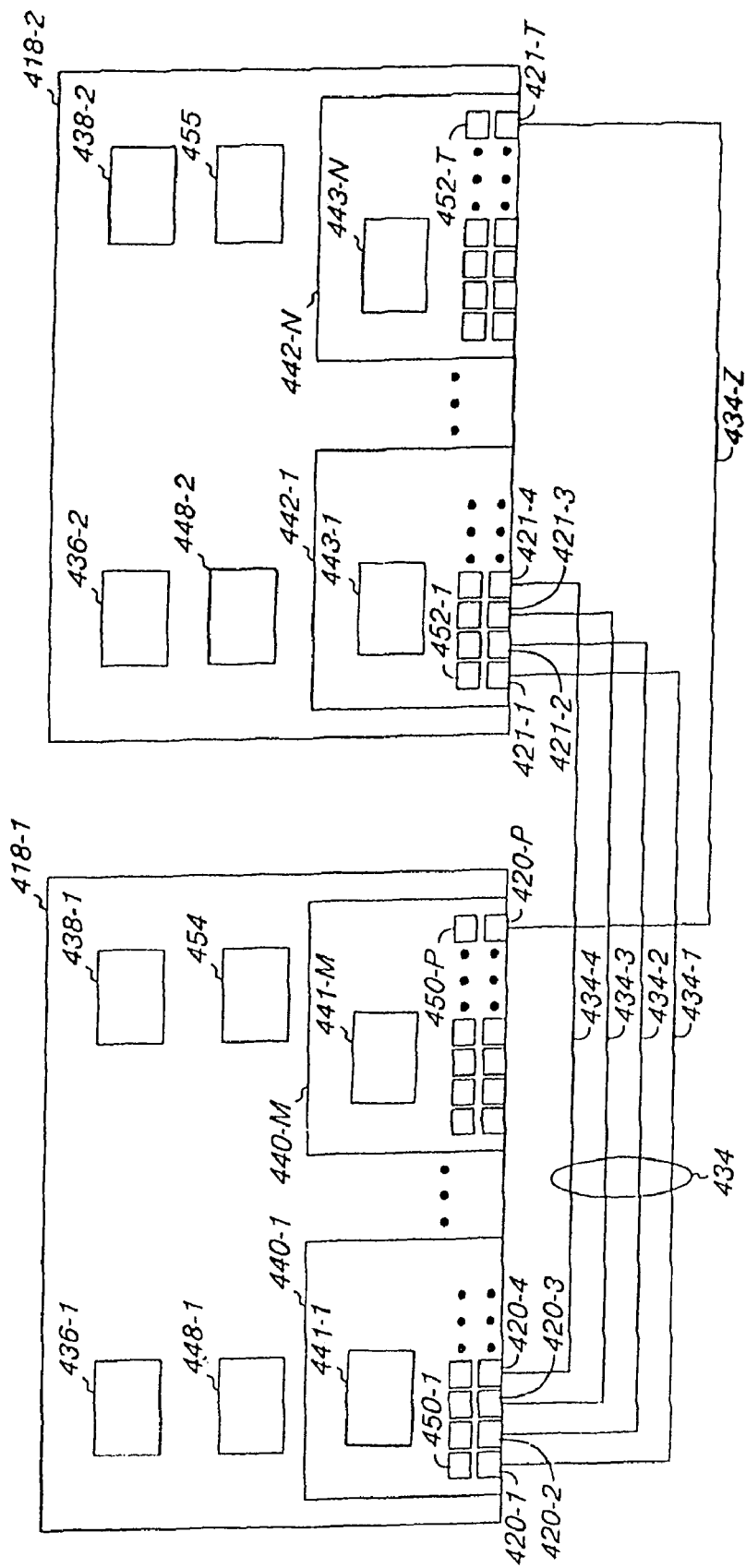
FIG. 4 illustrates two network devices including location indicators according to various embodiments of the invention.

As shown in FIG. 3, the switches 318-1, 318-2 include processor and memory resources, e.g., 436-1/438-1 and 436-2/438-2, as shown in FIG. 4. FIG. 3, and FIG. 4 shown below, illustrates how the number of cables and/or physical LAN wires connecting network devices can more than double when switches, e.g., 318-1 and 318-2, are added to a physical LAN. Network devices, e.g., 318-1 and 318-2, are not limited to any particular number of ports, e.g., ports, 320-1, 320-2, . . . , 320-M and 321-1, 321-2, . . . , 321-P. For example, a given switch, e.g., 318-1, can include up to two hundred eighty (280) ports.

As noted above, as more network devices are added to a physical LAN, the number of cables connecting the physical LAN network devices, including switches, routers, clients, bridges, etc. continues to increase, and the number of VLANs, as described herein continues to increase. In some situations, documentation of the location of each physical cable starting point is not maintained. In addition, such documentation may be difficult to maintain or locate when needed. In some LAN environments, physical cables can run through inaccessible areas such as conduits, loaded cable trays, and/or under floors, making it difficult to determine which particular physical cable connects a particular physical port, e.g., ports, 320-1, 320-2, . . . , 320-M and 321-1, 321-2, . . . , 321-P, and/or is connected to a particular physical network device, e.g., 318-1 and 318-2.

Programmable features and documentation of networked devices can be managed, e.g., via software and/or Web browsers, etc, as the same will be appreciated by one of ordinary skill in the art. However, when connectivity issues arise, the starting point and termination point of a physical wire, e.g., physical cable, connection can significantly assist in identifying and isolating physical LAN and/or virtual LAN connection issues and aid in troubleshooting network connectivity issues. By way of example, and not by way of limitation, one possible network connectivity issue, for physical and virtual LANs includes whether a physical wire is connected to a correct port.

The embodiments described next in connection with FIG. 4, can be performed by software (as the same has been described herein), hardware in the form of logic, and/or application modules (i.e., a self-contained hardware or software component that interacts with a larger system) on the systems and devices shown herein or otherwise. As the reader will appreciate, a software module may come in the form of a file and handle a specific task within a larger software system. A hardware module may be a separate set of logic, e.g., transistor/circuitry gates, that "plug-in" as a card or otherwise, to a larger system and/or device. Embodiments, described herein, are not limited to a particular operating environment and/or to software or executable instructions composed in a particular language or syntax.

Unless explicitly stated, method embodiments described herein are not constrained to a particular order or sequence. Additionally, some of the described method embodiments can occur or be performed at the same point in time.

FIG. 4 illustrates two network devices, e.g., switches 418-1 and 418-2, including device location indicators, e.g., 448-1 and 448-2, according to embodiments of the present invention. As described in more detail below, the device location indicators 448-1 and 448-2 are used to visually identify one particular network device, e.g., associated with a first location indicator 448-1 physically linked to a different network device, e.g., associated with a second location indicator 448-2. The embodiment of FIG. 4 illustrates a pair of network devices, e.g., switches 418-1 and 418-2, connected via a number of physical links, shown as 434-1, . . . , 434-Z, as can exist within a given network, e.g., network 100 in FIG. 1, and/or portion of a network 302 in FIG. 3.

As shown in FIG. 4, the switches, e.g., 418-1 and 418-2, include processor and memory resources, e.g., 436-1/438-1 and 436-2/438-2, respectively. The switches 418-1 and 418-2 also include a number of network chips, e.g., 440-1, . . . , 440-M and 442-1, . . . , 442-N, respectively, including logic circuitry, e.g., 441-1, . . . , 441-M and 443-1, . . . , 443-N, and a number of network ports, e.g., 420-1, . . . 420-P and 421-1, . . . , 421-T, respectively. The logic circuitry can be in the form of an Application Specific Integrated Circuit (ASIC) and serve as a MAC. The number of ports 420-1, . . . 420-P and 421-1, . . . , 421-T can be included on a network chip 440-1, . . . , 440-M and 442-1, . . . , 442-N having access to the processor and memory resources, e.g., 436-1/438-1 and 436-2/438-2, respectively, as well as the logic circuitry associated with the network chip (e.g., ASIC), 440-1, . . . , 440-M and 442-1, . . . , 442-N. The designators "P" and "T" are used to illustrate that various switches, e.g., 418-1 and 418-2, may support or contain a different number of ports.

In the example embodiment shown in FIG. 4, the first switch 418-1 is illustrated having ports 420-1, . . . , 420-P and the second switch 418-2 is illustrated having ports 421-1, . . . , 421-T. According to various embodiments, the first and second switches 418-1, 418-2 include computer executable instructions storable in respective memory resources, e.g., 438-1 and 438-2, and executable by respective processor resources 436-1 and 436-2, to send a locate signal to visually identify a particular switch, 418-1 and 418-2, and/or port, 420-1, . . . 420-P and 421-1, . . . , 421-T.

According to the embodiment shown in FIG. 4, each switch 418-1, 418-2, can include a device location indicator, e.g., switch indicator 448-1 and 448-2. In some embodiments, the switch indicator 448-1/448-2 can be a light emitting diode. Embodiments, however, are not limited to this example. That is, the device indicator 448-1/448-2 can also include other indicators that enable a given device, e.g., switch 418-1/418-2, to be visually identified when the device indicator, e.g., 448-1, 448-2, is activated by a locate signal.

The embodiment of FIG. 4 also illustrates that each port, 420-1, . . . 420-P and 421-1, . . . , 421-T, can include a port location indicator, e.g., 450-1, . . . 450-P and 452-1, . . . , 452-T, associated with one or more ports among the number of ports 420-1, . . . 420-P and 421-1, . . . ,421-T on a given network device, e.g., switches 418-1 and 418-2. In some embodiments, each port 420-1, . . . , 420-P on a given network device, e.g., the switch 418-1, can be associated with a separate port location indicator, e.g., 450-1, . . . 450-P. In some embodiments, the port location indicator, e.g., 450-1, . . . 450-P and 452-1, . . . , 452-T, can be a light emitting diode. However, embodiments are not limited to the LED example.

In some embodiments, the port location indicator, e.g., 450-1, . . . 450-P on device 418-1, can be smaller in size compared to the switch location indicator, e.g., 448-1. In addition, the port location indicator, e.g., 450-1, . . . . 450-P, and device location indicator, e.g., 448-1, can emit light in different colors or the same color. The port location indicator, e.g., 450-1, . . . 450-P, and device location indicator, e.g., 448-1, can also be distinguished by other features such as a pulse frequency, among others features.

As shown in the embodiment of FIG. 4, the second switch 418-2 can also include a device location indicator 448-2 and a port location indicator, 452-1, . . . , 452-T, associated with one or ports 421-1, . . . , 421-T, e.g., a second port 421-1 on the second switch 418-2. As the reader will appreciate, each of the port location indicators, 452-1, . . . , 452-T can be associated with the device location indicator 448-2.

By way of example, and not by way of limitation, one operational embodiment is described in connection with FIG. 4. As discussed above, network switches 418-1, 418-2 are connected via one or more physical links 434-1, . . . , 434-Z. In this example embodiment, physical link 434-1 extends from a first port 420-1 on the first switch 418-1 to a second port 421-1 on the second switch 418-2. In some embodiments, the physical link 434-1 can be a physical wire, e.g., cable, an optical fiber, among other physical links, etc.

According to various embodiments, each network device can also include a user interface, e.g., 454 on switch 418-1 and 455 on switch 418-2, such as a command line interface (CLI). According to some embodiments, the CLI 454, 455 can be a used for interacting with network devices or network device software using text line commands. Thus the CLI 454, 455 can be used to interact with a given switch, e.g., 418-1, 418-2. Commands can be entered from an input device such as a keyboard, and can be viewed as text on the user interface 454, 455. In some embodiments, the user interface 454, 455 can be a graphical user interface (GUI) in place of the CLI.

Accordingly, a user may enter a command into a CLI 454 that is associated with the network device, e.g., switch 418-1. In some embodiments, each network device, e.g., switches 418-1 and 418-2, can include its own user interface 454, 455, e.g., CLI. Additionally, a particular user interface 454, 455 can be associated with more than one network device. As the reader will appreciate, a CLI command uses a particular syntax and semantics. The syntax and semantics are the grammar and punctuation that particular commands will follow. As the reader will appreciate, in the case of commands associated with various Operating Systems (OS), each OS, e.g., MS-DOS, UNIX, Linux, etc., defines its own set of rules that the commands will follow. In the case of embedded systems (e.g., firmware) versus OS, each embedded system vendor (e.g., Nortel, Juniper Network, Hewlett Packard, or Cisco Systems), will define their own proprietary set of rules that the commands within their CLI conform to.

As the reader will appreciate, the semantics define what sort of operations are possible, and on what sort of data these operations can be performed. In some embodiments, the CLI 454, 455 can display a prompt, and a user can type a command into an input, such as a keyboard and/or touchscreen, to a particular network device, e.g., switch 418-1, such that computer executable instructions stored in the memory, e.g., 438-1, and executable by a processor, e.g., 436-1 can execute the command.

According to various embodiments, a user can enter a command to locate a particular port on a particular switch, for example, "locate port 420-1 on first switch 418-1". In various embodiments, once the locate command is entered, computer executable instructions are executed to activate a particular device location indicator, e.g., first switch indicator 448-1, associated with a first port 420-1 on the first switch 418-1. According to various embodiments, the locate command will also cause the computer executable instructions to execute to activate a particular port location indicator, e.g., first port 420-1 location indicator 450-1. As noted above, in various embodiments the first switch indicator 448-1 and the first port indicators 450-1 are light emitting diodes and the executed instructions will cause the indicators 448-1 and 450-1 to illuminate.

According to embodiments, the executable instructions will also execute to send a locate signal via the physical link 434-1 that is associated with the first port 420-1 to visually identify a different network device, e.g., switch 418-2, which is physically connected to the first port 420-1. The locate signal can trigger the execution of instructions on the different network device, e.g., switch 418-2, to which the physical link 434-1 is connected, to activate a second device location indicator, e.g., second switch indicator 448-2, on the device, e.g., 418-2, associated with a second port 421-1 on the second switch 418-2. According to various embodiments, the locate signal will also cause the computer executable instructions on the different network device, e.g., switch 418-2, to execute to activate a particular port location indicator, e.g., second port 421-1 location indicator 452-1. As noted above, in various embodiments the second switch indicator 448-2 and the second port indicator 452-1 are light emitting diodes and the executed instructions will cause the indicators 448-2 and 452-1 to illuminate.

In various embodiments, the instructions can execute such that the device location signal, e.g., 448-1 and 448-2, and port location indicator, 450-1 and 452-2, will be activated, e.g., illuminated, for a user configurable time duration on the first network device, e.g., 418-1, and/or the second network device, e.g., 418-2. The user configurable time durations may be configurable to be the same or different between various network devices, e.g., switch 418-1 and 418-2. That is, the configurable time duration may be configured to be longer in association with the second device location indicator, e.g., second switch indicator 448-2, on the second device, e.g., switch 418-2, as well as the second port location indicator, e.g., second port 421-1 location indicator 452-1. In some embodiments, the user configurable time duration can be variable based on a type of command entered into the CLI.

According to embodiments, the user configurable time may be varied based on a number of considerations. For example, the user configurable time may be varied based on an estimated or actual length of the physical link distance, a location of the second network device in a different physical location, e.g., another room, building, etc. For example, if the first and second network devices, e.g., 418-1 and 418-2, are located in one physical location, e.g., room, then the time duration may be chosen to be a first time duration, e.g., thirty (30) seconds. On the other hand, if the network devices e.g., 418-1 and 418-2, are located in different locations, e.g., different rooms, different buildings, etc. , the user configurable time duration may be chosen to be a second time duration, e.g., fifteen (15) minutes. Embodiments are not limited to these examples.

In various embodiments, a location signal may be generated by hardware logic on a given network chip, e.g., 440-1, computer executable instructions stored in memory 448-1 and executable by a processor 446-1, or a combination of both. For example, logic associated with a given network chip, 440-1, can send the locate signal once the locate command has been entered into a user interface, e.g., CLI 454, of a given network device, e.g., 418-1, and operated upon by software associated therewith. Additionally, in some embodiments, an external management system, e.g., a network management server such as 112 in FIG. 1, can be used to send a locate signal to visually identify a first and second network device, 418-1, 418-2, and a first and second port, 450-1,450-1, associated with a physical link, 434-1, between the first and second network devices, 418-1, 418-2.

As noted in connection with FIG. 1, each network device in a network is associated with a port of a switch to which it is connected and data frames, or packets, can be transferred between network devices by means of a switch's logic link control (LLC)/ media access control (MAC) circuitry associated with each switch port. A given network switch, e.g., 418-1, passes data frames received from a transmitting network device to a destination network device based on the header information in the received data frame.

Therefore, in some embodiments, a locate command and locate signal can be initiated via an external management system. In embodiments where an external management system, e.g., a network management server such as 112 in FIG. 1, is used to send a locate signal, a neighbor discovery protocol, such as The Institute of Electrical and Electronics Engineers 802.lab LLDP (i.e. , Link Layer Discovery Protocol) can be used. LLDP defines a method for network devices (e.g., switching devices 418-1, 418-2) to advertise information about themselves (via announcement messages) to other network devices and to store the information they receive from other network devices. Accordingly, device details (e.g., device configuration, device capabilities, and device identification) can be advertised using LLDP.

Link Layer Discover Protocol defines: a set of common announcement messages; a protocol for transmitting the announcement messages to network devices; and a method for storing the information contained within the announcement messages received from other network devices. Accordingly, in situations where LLDP is utilized, when a user uses an external management system to initiate a locate signal, the external management system can send a locate message to a first network device, e.g., switch 418-1, using a teletype network (telnet) session or simple network management protocol (SNMP) management information bases (MIBs) message to a given network device's, e.g., 418-1, user interface, e.g., CLI 454. Using either the telnet session or the SNMP MIBs, the locate message can cause the first network device, e.g., switch 418-1, to send an LLDP announcement message from a known port, e.g., 420-1, on the first network device, 418-1, to an unknown port, e.g., port 421-1 on the second network device 418-2, via the physical link 434-1 associated with the known port 420-1. In such embodiments, the LLDP announcement message can include a type length value (TLV) field that is modified by the external management system to trigger execution of the instructions associated with the locate signal, as the same have been described herein.

For example, once the locate message is received from a telnet session or SNMP MIBs, the first switch 418-1 can execute instructions to process the message to extract the locate signal criteria. The first switch 418-1 can then activate the switch indicator 448-1 and the first port indicator 450-1. The first switch 418-1 can also execute instructions to send the LLDP announcement message via the physical link 434-1 associated with the first port 420-1 to the second switch 418-2. Once the second switch 418-2 receives the LLDP announcement message, the second switch 418-2 can execute instructions to process the message to extract the locate signal criteria and execute instructions to activate the second switch indicator 448-2 and the second port indicator 452-1 associated with the physical link 434-1 that transmitted the locate signal.

Additionally, in some embodiments a user can enter the locate signal directly on the first switch 418-1 using the CLI 454-1 and also utilize the LLDP, as discussed herein. In such embodiments, the locate signal can cause the first switch 418-1 to activate the switch indicator 448-1 and the first port indicator 450-1, and also execute instructions to send an LLDP announcement message via the physical link 434-1 associated with the first port 420-1 to the second switch 418-2 to activate the second switch indicator 448-2 and the second port indicator 452-1 associated with the physical link 434-1 that transmitted the locate signal, as discussed herein.

As mentioned above, the LLDP can be used to return network device configuration parameters. The LLDP can be used in embodiments where a locate signal is sent using a telnet session or SNMP MIBs and/or in embodiments where the locate signal is initiated by a locate command entered into a user interface, e.g., CLI 454 on switch 418-1. In addition, in some embodiments, the locate signal can include instructions to return the network device configuration parameters to the user interface, e.g., CLI 454. Network device configuration parameters can include link state, link speed, and/or identification of connected ports, among others.

As discussed herein, in various embodiments, a locate command entered at a user interface, e.g., CLI 454, can cause executable instructions to send a locate signal via the physical link, e.g., 434-1, that is associated with a particular port, e.g., first port 420-1, to visually identify a different network device, e.g., switch 418, and different network port, e.g., 421-1, which is connected to the first port 420-1. In various embodiments, the locate signal can be used to locate ports that have been administratively disabled. In such embodiments, a link status may be "down". Nonetheless, as the reader will appreciate, the physical link, e.g., 434-1, still exists that physically connects the two ports, e.g., 420-1 and 421-1. Hence, according to embodiments, the locate signal can still be sent via the physical link 434 to activate the switch indicators, e.g., 448-1, 448-2 and port indicators 450-1, 452-1 to visually identify the two ports, 420-1, 421-1, and/or switches, 418-1, 418-2, a physical link 434-1 connects.

It is to be understood that the above description has been made in an illustrative fashion, and not a restrictive one. Although particular embodiments have been illustrated and described herein, those of ordinary skill in the art will appreciate that other component and device logic arrangements can be substituted for the particular embodiments shown. The claims are intended to cover such adaptations or variations of various embodiments of the disclosure, except to the extent limited by the prior art.

In the foregoing Detailed Description, various features are grouped together in a single embodiment for the purpose of streamlining the disclosure. This method of disclosure is not to be interpreted as reflecting an intention that any of the appended claims requires more features than is expressly recited therein. Rather, as the following claims reflect, inventive subject matter may lie in less than all features of a single disclosed embodiment. Thus, the following claims are hereby incorporated into the Detailed Description, with each claim standing on its own as a separate embodiment of the invention.

What is claimed:

1. A network device, comprising:
   a processor;
   a memory connected to the processor;
   a network chip, connected to the processor and the memory, the network chip including logic and a number of ports;
   a first device location indicator connected to the processor and the memory and visually identifying the network device in response to a locate signal;
   a first port location indicator associated with a first port of the number of ports on the network chip and visually identifying the first port in response to the locate signal;
   a physical link between the first port on the network device and a port on a different network device; and
   computer executable instructions storable in the memory and executable by the processor to send the locate signal via the physical link to visually identify the different network device.

2. The network device of claim 1, wherein the port on the different network device is included among a number of ports on a network chip of the different network device, the different network device having access to processor and memory resources.

3. The network device of claim 2, wherein the network device is a first network switch and the different network device is a second network switch.

4. The network device of claim 3, wherein the second network switch includes a second location indicator associated with the second network switch, and wherein the locate signal visually identifies the second network switch.

5. The network device of claim 4, wherein the physical link extends from a first port on the first network switch to a second port on the second network switch, and wherein the locate signal is sent via the physical link.

6. The network device of claim 4, wherein the first location indicator and the second location indicator are light emitting diodes.

7. The network device of claim 3, wherein the first network switch includes the first port location indicator and the second network switch includes a second port location indicator.

8. The network device of claim 7, wherein the first and second port location indicators of the first and the second network switches are light emitting diodes.

9. A network system including a number of network devices, comprising:
   a first network device physically linked to a second network device, where the first network device and the second network device each include:
   a processor;
   a memory connected to the processor;

a network chip, connected to the processor and the memory, the network chip including logic and a number of ports;

a first device location indicator connected to the processor and memory on the first network device and visually identifying the first network device in response to a locate signal;

a first port location indicator associated with a first port of the number of ports in the first network device and visually identifying the first port in response to the locate signal;

a second device location indicator connected to the processor and memory on the second network device and visually identifying the second network device;

a second port location indicator associated with a second port of the number of ports in the second network device and visually identifying the second port;

a physical link between the first port on the first network device and the second port on the second network device; and computer executable instructions storable in the memory and executable by the processor on the first network device to send the locate signal from the first network device to the second network device to cause the second device location indicator and the second port location indicator on the second network device to illuminate.

10. The system of claim 9, wherein the first network device and second network device include a plurality of port location indicators.

11. The system of claim 10, wherein the locate signal causes the first and second device location indicators on the first and second network devices to illuminate.

12. The system of claim 11, wherein the locate signal causes the first port location indicator on the first network device to illuminate.

13. The system of claim 12, wherein the locate signal causes the first device location indicator and the first port location indicator to illuminate for a user configurable time duration.

14. The system of claim 9, further including a command line interface (CLI) associated with the first network device and wherein the locate signal returns second network device configuration parameters to the CLI.

15. A computer readable storage device having executable instructions which can be executed by a processor to cause a network device to perform a method, comprising:

associating a first device location indicator with a first network device for visually identifying the first network device;

associating a first port location indicator with a first port on the first network device for visually identifying the first port;

associating a second device location indicator with a second network device for visually identifying the second network device, wherein the second network device is physically linked to the first network device at the first port;

using a locate signal to activate the first device location indicator and the first port location indicator;

sending the location signal from the first network device to the second network device via the physical link to activate the second location indicator.

16. The storage device of claim 15, wherein the first network device receives the locate signal from a user via a user interface.

17. The storage device of claim 16, wherein the method includes:

associating a second port indicator with a second port on the second network device, wherein the locate signal activates the second port indicator.

18. The storage device of claim 16, wherein the method includes returning second network device configuration parameters to a command line interface associated with the first network device.

19. The storage device of claim 15, wherein sending the location signal includes sending a locate packet signal in accordance with a Data Link Layer Discovery Protocol (LLDP).

20. The storage device of claim 19, wherein the method includes specifying a type, length, and value entry in association with the locate packet signal.

* * * * *